United States Patent [19]

Harada et al.

[11] Patent Number: 4,777,357
[45] Date of Patent: Oct. 11, 1988

[54] BAR CODE READER

[75] Inventors: Osamu Harada, Atsugi; Souhei Ikeda, Hadano; Akio Kojima, Hadano; Yoshihisa Watanabe, Hadano; Keiichi Isozaki, Minamiashigara, all of Japan

[73] Assignees: Hitachi, Ltd., Tokyo; Hitachi Computer Engineering Co., Ltd., Kanagawa, both of Japan

[21] Appl. No.: 927,937

[22] Filed: Nov. 7, 1986

[30] Foreign Application Priority Data

Nov. 11, 1985 [JP] Japan ............................ 60-250769

[51] Int. Cl.⁴ .............................................. G06K 7/10
[52] U.S. Cl. .................................... 235/463; 235/462; 235/494
[58] Field of Search ................ 235/462, 463, 494, 465

[56] References Cited

U.S. PATENT DOCUMENTS

| | | | |
|---|---|---|---|
| 3,309,667 | 3/1967 | Feissel | 235/494 |
| 3,688,955 | 9/1972 | L'Huillier | 235/494 |
| 4,079,239 | 3/1978 | Gottschalk | 235/463 |
| 4,533,825 | 8/1985 | Yamada | 235/463 |

FOREIGN PATENT DOCUMENTS 0079581  5/1982  Japan ................................ 235/462

Primary Examiner—J. R. Scott
Assistant Examiner—Leon K. Fuller
Attorney, Agent, or Firm—Antonelli, Terry & Wands

[57] ABSTRACT

Bar codes and auxiliary characters representative of the contents of the bar codes are printed on an article which is limited with respect to the available space in distinguishably recognizable and superposed relations. By selecting appropriately the lightness of the auxiliary characters, reflected light resulting from scanning of the bar code is converted into an electrical signal which is subsequently converted into a binary signal with the signal components due to the auxiliary characters being neglected, to thereby extract only the signal originating in the bar code. A bar code reader is provided which comprises an A/D converter for compensating the output of bar code detection due to the character pattern superposed on the bar code.

6 Claims, 2 Drawing Sheets

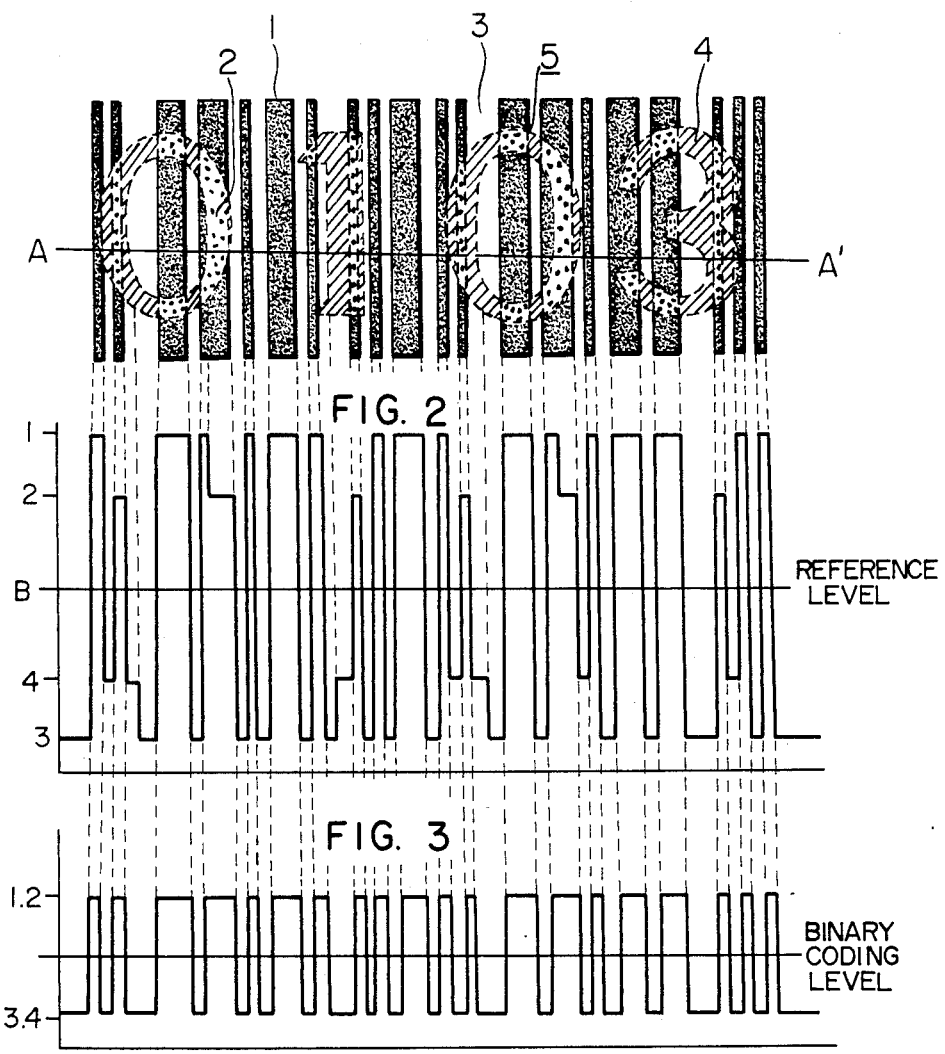

BAR CODE READER

BACKGROUND OF THE INVENTION

The present invention generally relates to a novel bar code and bar code reader apparatus and method, and more particularly to a bar code reader adapted to read a bar code attached with an auxiliary character string indicative of the contents of the associated bar code.

Numerous apparatus for reading bar codes printed on articles are employed extensively. Since the bar code is inconvenient for reading by a human being, an auxiliary character string is often printed on an article at a location in the vicinity of the bar code for indicating the contents thereof. However, in the case of an article in which a region or space available for printing the bar code is limited, the auxiliary character string occupies a considerable proportion of the space, imposing thus restriction on the use of the remaining area. For example, see U.S. Pat. No. 4,276,470.

SUMMARY OF THE INVENTION

An object of the present invention is to provide a bar code reader apparatus which is capable of reading a bar code from a bar code indication region where a bar code is indicated in superposition with an auxiliary character.

In view of the above object, there are provided according to a feature of the present invention a bar code for use with an article where the bar code contains in superposing relationship an auxiliary character having two portions which together are indicative of the contents of the bar code, such that the mean value of light reflectivity of a first portion of the auxiliary character which intersects with the bars is at a first intermediate level between the value of light reflectivity of the bar marks and a reference value of light reflectivity level which is substantially the mean value of light reflectivity of the bar and a white background of the bar code, while the mean value of light reflectivity of a second portion of the auxiliary character intersecting with the white background of the bar code is at a second intermediate level between that of the white background of the bar code and the abovementioned reference level. A novel bar code is also provided reader for reading such a bar code. The bar code reader comprises a scanner for scanning the bar code attached to the article to detect reflected light therefrom for converting it into an electrical signal, and an analog-to-digital (A/D) converter for converting the electrical signal derived from the first portion into a binary level of the same value as that of the binary level derived from the bar, while converting the electrical signal derived from the second portion into a binary level of the same value as that of the binary level derived from the white background, wherein the electrical signal level corresponding to the reference level is utilized as a threshold value.

BRIEF DESCRIPTION OF THE DRAWINGS

FIG. 1 is a top plan view showing an example of a bar code indication with which the present invention is concerned;

FIG. 2 is a waveform diagram for illustrating output levels of a bar code scanner resulting from the scanning of the bar code illustrated in FIG. 1;

FIG. 3 is a waveform diagram for illustrating the output levels of the bar code scanner shown in FIG. 2 after having been converted into a binary coded signal;

DESCRIPTION OF THE PREFERRED EMBODIMENTS

Figure 4:
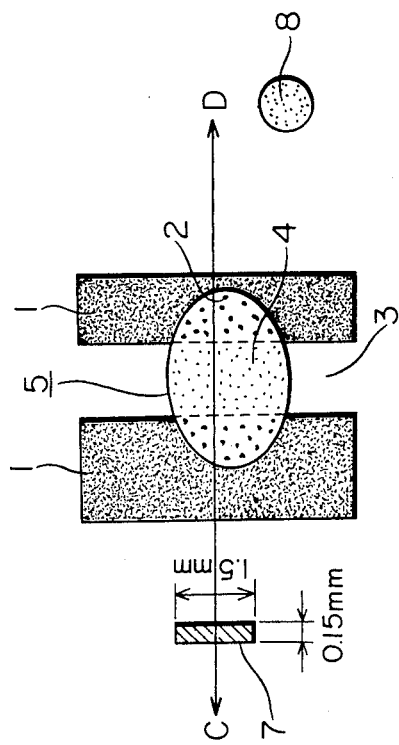
FIG. 4 is a view for illustrating schematically a relationship between an exemplary bar code indication and a standard region on an enlarged scale.

Now, the present invention will be described in conjunction with a preferred embodiment thereof by referring to the accompanying drawings.

FIG. 1 shows, by way of example, a bar code and an auxiliary character string indicated on an article in a bar code indication region, wherein the bar code and the auxiliary character string are printed in superposition on each other. In FIG. 1, a reference numeral 1 denotes a bar mark in black and 3 denotes a white background portion of the bar code. 5 denotes an auxiliary character string, 2 denotes a first portion of an auxiliary character which intersects with the black bar mark 1 in superposition, and 4 denotes a second portion of the auxiliary character 5 which intersects the background portion 3 which may be white. In the case of the illustrated example, the code representation is made in accordance with the standard Code 39. It should however be understood that the concept of the invention can equally applied to the other standard codings and colors.

FIG. 4 shows in an enlarged scale a region where a character is superposed on a bar code. The reading of a bar code is usually performed in such a manner in which an infrared light spot of a predetermined area (e.g. an elliptical spot in a size of 1.5 mm×0.15 mm) is projected onto the bar code, and a logic "1" or "0" signal is derived in dependence on the intensity of the reflected light. In FIG. 4, a numeral 7 denotes the spot of infrared light. The bar code is scanned with the infrared light spot 7 in the direction indicated by an arrow C or D. In this connection, it is assumed that the total black or mark area within a region covered by the spot 7 is represented by a logical "high" level and other areas are represented by a logical "low" level. A numeral 8 denotes a reference level region serving to produce a threshold signal for use in distinguishing between these levels. In the case of the illustrated example, the first portion 2 of the auxiliary character 5 has a total black area having a color density which is greater than that of the reference area 8, while the second portion 4 has an area in black having a color density which is less than that of the reference region 8. In other words, the first portion 2 has the intermediate level between the value of light reflectivity of the bar and that of the reference region 8, while the second portion 4 has the intermediate level between the value of light reflectivity of the reference region 8 and that of the white background. It should be noted here that the value of reflectivity of the region 8 may be substantially an arithmetic mean or average value of the light reflectivity of the bar marks and the white background as in the previous case.

Figure 5:
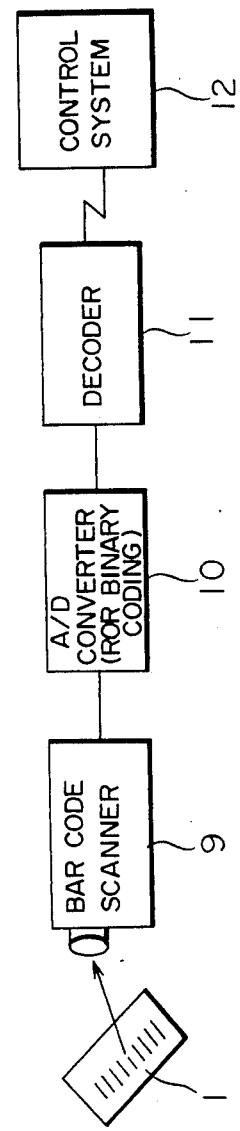
FIG. 5 is a block diagram showing a general arrangement of a bar code reader according to an embodiment of the present invention.

FIG. 5 shows in a block diagram a general arrangement of a bar code reader according to an embodiment of the present invention. In this Figure, a reference numeral 9 denotes a bar code scanner which is so implemented as to scan with the infrared light spot an article attached with an indication constituted by a bar code and an auxiliary character string superposed onto each other and to convert the reflected light into an electrical signal Numeral 10 denotes an analog-to-digital (A/D) converter for converting the output electrical signal of the scanner 9 into a binary coded signal with a reference level or value derived from the reference region 8 being used as the threshold value for the binary coding. Numeral 11 denotes a decoder for storing the output of the A/C converter 10 to convert it into a character code, and finally a numeral 12 denotes an upper control system to which the output code data from the decoder 11 is transferred.

During operation bar code scanner 9 scans with the infrared light spot a bar code region such as shown in FIG. 1 and receives the reflected light, which is then converted into an electrical signal derived by the bar code scanner 9. The electrical signal will then be of such a waveform as illustrated in FIG. 2. More specifically, the signal waveform shown in FIG. 2 is generated through the scanning along a line A—A' in FIG. 1 in which the time lapse in the course of the scanning is taken along the abscissa, while the level of the output waveform is taken along the ordinate. As will be seen in FIG. 2, although the output of the scanner produced upon scanning the first portion 2 is lower than the output level produced upon scanning the bar 1, the former is higher than the reference level produced upon scanning the standard or reference region 8. On the other hand, although the output level of the scanner produced at the time of scanning the second portion 4 is higher than the output level produced upon scanning the white background portion 3, the former is lower than the abovementioned reference level. When the electrical signal produced in this manner is binary-coded through the A/D converter 10, the resultant binary data is such as illustrated in FIG. 3. It should be noted that the binary data shown in FIG. 3 is the same as the binary data which can be obtained only from the corresponding bar code which is not superposed with the auxiliary character string 5.

According to the present invention, a bar code and an auxiliary character string can be indicated in superposition at the same indication region, and only the bar code can be derived from that region for reading. Thus, there is provided a bar code reader apparatus which imposes substantially no serious restriction on the bar code indication of articles.

We claim:

1. A combination of a bar code and a character indicative of the contents of said bar code adapted to be used with an article and a bar code reader, wherein said bar code is formed of spaced bars of a marking material with said character having lesser amounts of marking material to make the character distinguishably recognizable, said character marking material being superposed with the bar marking material such that a first area of said character overlapping with bar marking material has an average value of light reflectivity at a first level between the value of light reflectivity of said bar marks and a binarizing threshold reference level and a second area of said character marking material overlapping with a background region of said bar code and having a value of light reflectivity of a second level between the value of light reflectivity of said background and said binarizing threshold reference level.

2. The combination according to claim 1, wherein said first area of the character has a higher density of marking material than the density of marking material on a reference area defining a binarizing threshold and said second portion of the character has a lower density of marking material than the density of marking material on said reference area.

3. The combination according to claim 1, wherein the marking material of said bar code and said character are applied to a surface of a sheet of material or a surface of said article.

4. A bar code reading apparatus together with a bar code character indicative of the contents of said bar code attached to an article wherein the bar code is formed of space bars of a marking material with said character having lesser amounts of marking material to make the character visually recognizable, said character marking material being superposed with the bar marking material such that a first area of said character overlapping with said bar marking material has an average value of light reflectivity at a first level between the value of light reflectivity of said bar and a binarizing threshold reference level and a second area of said character marking material overlapping with a background region of said bar code and having a value of light reflectivity of a second level between the value of light reflectivity of said background and said binarizing threshold reference level, said reading apparatus comprising a scanner with a predetermined light spot for scanning said bar code to detect light reflected therefrom for converting the reflected light into an electrical signal with the electrical levels in said electrical signal corresponding to said first area and said second area being proportional in magnitude to the reflective light from said bar code, and an analog-to-digital converter for converting said electrical signal derived from said first portion into a binary level of the same value as that of the binary level derived from said bar marks while converting the electrical signal derived from said second portion into a binary level of the same value as that derived from the background of said code bar.

5. The apparatus according to claim 4, wherein said scanner comprises means for scanning a light spot across the bar code and means for picking up light reflected from the bar code.

6. A method of identifying an article by use of a composite bar code and character that is visually discernable by:
forming a bar code having parallel bars of colored marking material separated by background spaces;
producing visually discernable characters, each of which bridges a plurality of said bars inside the field of said bar code, said characters having a plurality of first portions which have an average value of light reflectivity at a first level between the value of light reflectivity of a bar of said marking material and a binarizing threshold reference level and a plurality of second portions which have an average value of light reflectivity at a second level between the value of light reflectivity of a background space and said binarizing threshold reference level,
scanning said bar code through a region including said first and second portions by converting the light reflected from said first portions into an electrical signal corresponding to an electrical signal produced by said bars and converting the light reflected from said second portions into an electrical signal corresponding to an electrical signal produced by said background.

* * * * *